US006957991B2

(12) United States Patent
Gibbs (10) Patent No.: US 6,957,991 B2
(45) Date of Patent: Oct. 25, 2005

(54) POWER TRAIN (75) Inventor: Alan Timothy Gibbs, London (GB)

(73) Assignee: Gibbs Technologies Limited (GB)

( * ) Notice: Subject to any disclaimer, the term of this patent is extended or adjusted under 35 U.S.C. 154(b) by 66 days.

(21) Appl. No.: 10/343,372

(22) PCT Filed: Aug. 9, 2001

(86) PCT No.: PCT/GB01/03576

§ 371 (c)(1),
(2), (4) Date: Jan. 30, 2003

(87) PCT Pub. No.: WO02/12005

PCT Pub. Date: Feb. 14, 2002

(65) Prior Publication Data

US 2003/0153215 A1 Aug. 14, 2003

(51) Int. Cl.$^7$ .................................................. B60F 3/00
(52) U.S. Cl. ............................. 440/12.51; 440/12.57; 440/12.61
(58) Field of Search ................... 440/12.5, 12.51, 440/12.52, 12.53, 12.54, 12.66, 12.57, 12.58, 12.59, 12.6, 12.61

(56) References Cited

U.S. PATENT DOCUMENTS

| | | | | |
|---|---|---|---|---|
| 2,350,037 A | * | 5/1944 | Hofheins et al. | 440/12.53 |
| 2,878,883 A | * | 3/1959 | France et al. | 180/9.46 |
| 2,981,221 A | * | 4/1961 | Gillois et al. | 440/12.54 |
| 3,198,161 A | * | 8/1965 | Andrews et al. | 440/41 |
| 3,199,486 A | * | 8/1965 | Gillois et al. | 440/12.53 |
| 5,692,590 A | * | 12/1997 | Iihara et al. | 192/69.43 |
| 5,752,862 A | | 5/1998 | Mohler et al. | 440/38 |
| 6,764,358 B2 | * | 7/2004 | Gibbs | 440/12.5 |
| 2004/0092175 A1 | * | 5/2004 | Roycroft | 440/12.5 |

FOREIGN PATENT DOCUMENTS

| | | | |
|---|---|---|---|
| CH | 410 660 | * | 3/1966 |
| DE | NR 410660 | | 3/1925 |
| EP | 0 341 009 | * | 11/1989 |
| FR | 2 776 964 | * | 10/1999 |
| FR | 2776964 | | 10/1999 |
| WO | WO 95/23074 | * | 8/1995 |
| WO | WO 02/14092 A1 | * | 2/2002 |

OTHER PUBLICATIONS

International Search Report dated Nov. 28, 2001.
Search Report of United Kingdom dated Mar. 1, 2001.

* cited by examiner

Primary Examiner—Sherman Basinger
(74) Attorney, Agent, or Firm—Young & Basile, P.C.

(57) ABSTRACT

Power train or an amphibious vehicle having an engine, transmission, and transfer case position in-line with longitudinal vehicle axis towards the rear of the vehicle, with transmission output facing the front of the vehicle. The transfer drive drives the rear wheels via propeller shaft, which extends adjacent the engine to rear differential. A marine drive PTO (power take off) may be taken from a shaft from the transfer case, from the propeller shaft, or from engine crankshaft pulley. Marine drive shaft may run below the engine, or alongside it, on the opposite side of the engine from propeller shaft. Decouplers may be provided to the PTO drive, to at least one rear wheel, and on the optional front axle propeller shaft.

14 Claims, 6 Drawing Sheets

POWER TRAIN

BACKGROUND OF THE INVENTION

This invention relates to a power train which is particularly suitable for use in an amphibious vehicle capable of travel on land and water, and more particularly to an adaptation of a conventional automotive power train having an in-line engine and speed change transmission to drive both the rear wheels and the marine propulsion unit of an amphibious vehicle. The invention also relates to an amphibious vehicle having such a power train.

In a known automotive power train arrangement for a conventional land based vehicle, an engine and speed change transmission are positioned at the front of the vehicle in-line with the longitudinal axis of the vehicle. The driving end of the transmission faces the rear of the vehicle, and is connected by a drive shaft, otherwise known as a propeller shaft, to a rear differential for driving the rear wheels of the vehicle.

It is also known to use an in-line engine and speed change transmission to drive the wheels and marine propulsion unit of an amphibious vehicle. For example U.S. Pat. No. 4,958,584 (Williamson) discloses a power train arrangement in which the engine and transmission are located at the rear of the vehicle, with the driving end of the transmission facing the front of the vehicle. A propeller shaft provides drive from the transmission to a front differential for driving the front wheels of the vehicle. The rear wheels of the vehicle are not driven. A marine propulsion unit is positioned behind the engine, and is driven from the timing end of the crank shaft of the engine. This arrangement is best seen in FIG. 5 of U.S. Pat. No. 4,958,584.

U.S. Pat. No. 4,838,194 (Williamson) is the parent application to U.S. Pat. No. 4,958,584 above. This patent also discloses an amphibious vehicle having a power train arrangement in which an in-line engine and transmission appear to be located at the rear of the vehicle, with the driving end of the transmission facing the front of the vehicle. The front wheels are driven by a shaft from a transfer case which also provides drive to a rearward facing marine drive.

The marine drive has a long propeller shaft to a screw propeller, both of which, along with a rudder, can be raised for road use; and lowered for marine use. The arrangement leaves little room anywhere in the vehicle for an engine and speed change transmission; the location of which is not specifically disclosed.

If the engine and transmission are located behind the vehicle rear axle (as in the case in the continuation in part U.S. Pat. No. 4,958,584), they would either have to be located above the propeller shaft, raising the centre of gravity to the detriment of vehicle handling on land and water; or to one side of the propeller shaft, giving odd weight distribution, and packaging problems. Either of these options would need a skewed drive to the transfer box, leading to power losses and possible NVH (noise, vibration, and harshness) problems. It should also be noted that the long vertically adjustable propeller shaft would give rise to sealing problems in the bottom of the hull, which could lead to water ingress and corrosion problems in the transfer case. Altogether, this does not appear to be a practical layout for an amphibious vehicle.

European patent No EP 0 341 009 (Royle) shows a further example of an amphibious vehicle in which an in-line engine and transmission are provided at the rear of the vehicle, with the output of the transmission facing the front of the vehicle. In this layout, the transmission drives the rear wheels of vehicle via a drive shaft, whilst a marine propulsion unit, located behind the engine, is driven from the timing end of the engine.

There are significant disadvantages in the above known amphibious vehicle power train arrangements, especially in the light of the high demands which are required of a modern vehicle in road operation as discussed below.

When a vehicle accelerates in a forward direction, the front of the vehicle tends to lift upwards in reaction to the rotational acceleration of the wheels relative to the vehicle. This happens irrespective of whether the vehicle is front or rear wheel drive and can lead to a loss of traction between the front wheels and the road under acceleration. This problem is exaggerated in the known amphibious vehicle arrangements where the engine is positioned behind the rear wheels of the vehicle. This is because the weight of the engine when positioned behind the rear wheels adds to the lifting force; as opposed to a conventional power train arrangement with the engine at the front of the vehicle, where the engine weight would counteract the lifting force. Consequently, in the known amphibious vehicle arrangements, the front wheels will tend to lose traction under acceleration. In practice this causes excessive wheel spin and tire wear. This is a particular problem in the Williamson layouts in which the vehicle is front wheel drive.

Furthermore, when a vehicle leaves a bend, the adhesion between the tyre and road surface must resist both acceleration and centrifugal forces. If the combination of these forces approaches or goes beyond the tractive limits of the front tyres, an under-steer condition will occur. In the conventional land based vehicle power train arrangements previously mentioned, the weight of the engine is positioned at the front of the vehicle, which reduces the tendency to under-steer when cornering. However, in the known amphibious vehicle arrangements in which the weight of the engine is behind the rear wheels, there will be a reduction in the load on the front wheels which increases the likelihood of under-steer occurring.

It is also known to provide for four wheel drive capability in conventional land based automotive vehicles having an in-line engine and speed change transmission located at the front of the vehicle. In such arrangements, the output end of the transmission faces the rear of the vehicle and a transfer case is used to selectively drive the rear wheels only or the front and rear wheels.

It has been proposed to use an automotive power train of this type to drive an amphibious vehicle, using the rear wheel drive to drive the marine propulsion unit and the front wheel drive to drive the front wheels. In order to use the power train in this way, it is necessary to locate the engine and transmission in the conventional position, towards the front of the vehicle.

Owing to rearward weight bias requirement for travel on water in an amphibious vehicle, it has been found unsuitable to locate the engine and transmission in this conventional position. It has also been found, contrary to the teachings in the Williamson patents, to be unsuitable to drive only the front wheels of an amphibious vehicle from a rear or mid-mounted engine, because the weight of the engine is not over the driving wheels. This limits traction on wet slipways, leading to problems leaving water; and can lead to wheel spin and rapid tyre wear on the road.

SUMMARY OF THE INVENTION

It is an object of the present invention to provide a power train for an amphibious vehicle in which a conventional in-line engine and speed change transmission are utilised and in which the above disadvantages are reduced or substantially obviated.

In accordance with a first aspect of the present invention, there is provided a power train for an amphibious vehicle comprising an in-line engine and speed change transmission assembly adapted such that the engine can be positioned towards the rear of the vehicle with the transmission output facing the front of the vehicle, the power train also comprising a power take off means adapted to drive a marine propulsion unit located behind the engine, characterised in that a transfer drive is provided in-line with the transmission, the transfer drive being adapted to drive the rear wheels of the vehicle via a first drive shaft which extends adjacent to the engine such that the engine can be positioned at least partially forward of the rear wheels of the vehicle.

In a particularly preferred embodiment, the power train is adapted so that the engine is mounted between the rear wheels and the front wheels of the vehicle.

In one preferred embodiment the power take off is provided by the transfer box which drives the marine propulsion unit by means of a second drive shaft which runs substantially parallel to and below the engine. Alternatively, the second drive shaft could run substantially parallel to and along one side of the engine. In this latter arrangement, it is preferable if the first drive shaft runs along an opposite side of the engine to the second drive shaft.

In an alternative preferred embodiment, the power take off is driven by the engine crankshaft at the timing end of the engine.

In a yet further alternative preferred embodiment, the power take off comprises a further transfer drive which is fitted to, and driven by, the first drive shaft.

The marine propulsion unit may be a water jet, or a marine screw propeller.

A decoupler may be provided in the drive line from the power take off to the marine propulsion unit, to enable drive to the marine propulsion unit to be selectively coupled and decoupled.

Preferably, the first drive shaft is adapted to drive the rear wheels of the vehicle via a rear differential. Where a four wheel drive capability is required, the transfer drive can also drive a third drive shaft which is adapted to drive the front wheels of the vehicle through a front differential.

In an advantageous embodiment, a decoupler is provided in the drive line between the transmission and at least one of the driven road wheels, such that drive to the at least one driven wheel can be selectively coupled or decoupled.

Where a decoupler is provided for coupling drive to a wheel drive shaft, the decoupler may incorporate a synchromesh mechanism and may be combined with a constant velocity joint.

In accordance with a second aspect of the invention, there is provided amphibious vehicle having a power train in accordance with the first aspect of the invention.

BRIEF DESCRIPTION OF THE PREFERRED EMBODIMENT

Several embodiments of the invention will now be described, by way of example only, with reference to the following drawings in which.

DETAILED DESCRIPTION OF THE PREFERRED EMBODIMENT

Common reference numbers have been used throughout the drawings to denote parts in common between the different embodiments.

Figure 1:
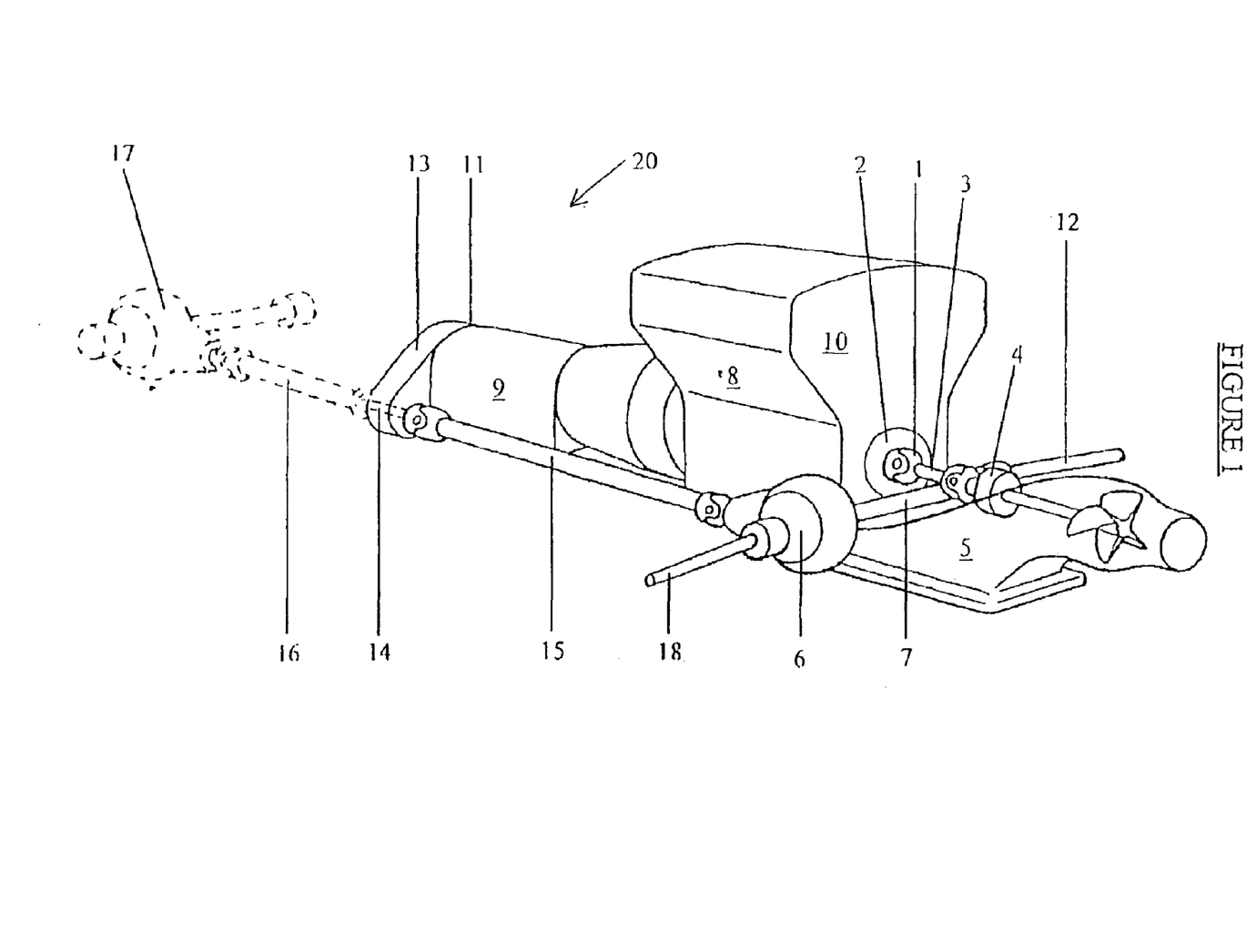
FIG. 1 is a perspective view of a first embodiment of a power train for an amphibious vehicle in accordance with the invention, in which a power take off is connected to a crankshaft pulley of the engine.
Figure 2:
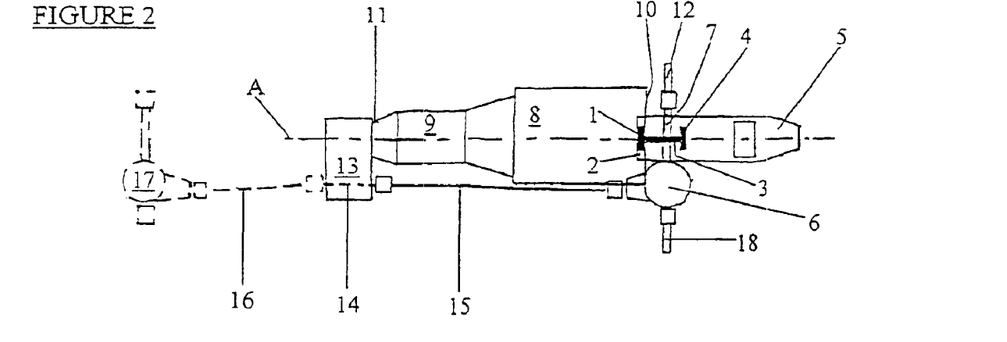
FIG. 2 is plan view of the power train of FIG. 1.
Figure 3:
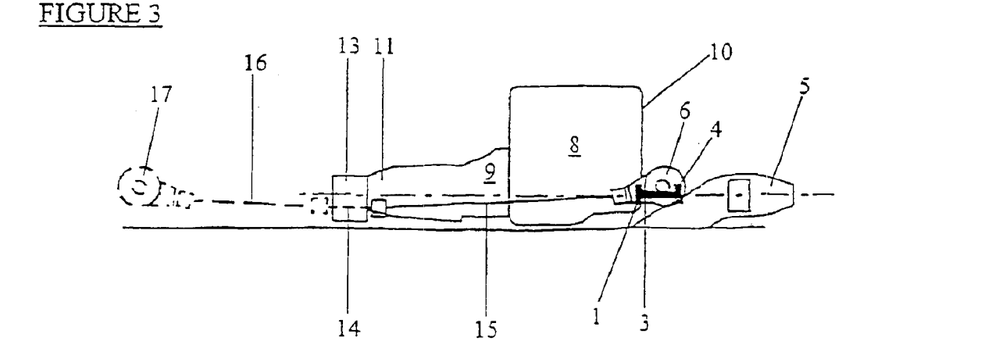
FIG. 3 is side view, partially in section, of a modified form of the power train of FIGS. 1 and 2.

Referring firstly to FIGS. 1 to 3, a power train for use in an amphibious vehicle is generally indicated at 20, and includes a longitudinal power train assembly comprising an engine 8 and speed change transmission or gearbox 9 arranged in-line with the longitudinal axis of the vehicle A. The timing end 10 of the engine is located towards the rear of the vehicle and the output from the transmission faces the front of the vehicle.

A transfer drive 13 is fitted in-line at the output end 11 of the transmission 9 and transfers drive from the transmission 9 to a countershaft 14, the axis of which is offset relative to the longitudinal axis A of the engine 8 and transmission 9. The countershaft 14 is coupled to a first drive shaft 15, in the form of a propeller shaft, which runs parallel to and along one side of the engine 8 to drive a rear differential 6. The differential 6 provides drive to the right hand side (as viewed in FIG. 1) rear wheel of the vehicle via a relay shaft 7 and a further drive shaft 12, whist the differential 6 drives the left hand (as viewed) rear wheel via a drive shaft 18.

A decoupler or decouplers (not shown) may be provided in the drive line between the transmission and at least one of the driven road wheels to selectively decouple drive to the wheels when the vehicle is in marine mode. For example, a decoupler could be provided between the counter shaft 14 and the first drive shaft 15. Alternatively, a decoupler or decouplers could be provided between the differential 6 and one or both of the rear wheels. In this latter arrangement, the or each decoupler could be provided between the differential 6 and a wheel drive shaft 12, 18, or between a wheel drive shaft 12, 18 and its respective rear wheel. Where a decoupler is used to decouple drive to a wheel drive shaft 12, 18, the decoupler may be of the type which incorporates a synchromesh mechanism and is combined with a constant velocity joint. Such a decoupler is disclosed in the applicant's co-pending U.S. 2004/0092175 A1, the contents of which are hereby incorporated by reference.

A power take off for driving a marine propulsion unit 5 located behind the engine is driven by the engine crankshaft at the timing end of the engine. In the present embodiment, the power take off is provided in the form of a coupling 1 which is fitted to, and is driven by, a crankshaft pulley 2 of the engine 8. The crankshaft pulley 2 being at the timing end of the engine 8. A second drive shaft 3 is connected at one end to the coupling 1 and at the other end to a decoupler 4 which selectively couples and decouples drive from the second drive shaft 3 to the marine propulsion unit 5. The marine propulsion unit may be a water jet or marine screw propeller.

In circumstances where a pulley is not provided at the timing end of the crankshaft, the power take off may be connected to the timing end of the crankshaft by any suitable means. For example, the power take off could be connected to a sprocket provided at timing end of the crankshaft, or the power take off may be connected directly to the timing end of the crankshaft as appropriate.

In the arrangement shown, the relay shaft 7 which drives the right hand rear wheel is located between the engine 8 and the marine propulsion unit 5. The relay shaft 7 can be positioned below the second drive shaft 3, as shown in FIGS. 1 and 2, or above the second drive shaft 3, as shown in FIG. 3, depending on the vehicle layout.

Where a four wheel drive capability is required, the counter shaft 14 can be connected to a third drive shaft 16 which drives the front wheels (not shown) via a front differential 17. A decoupler or decouplers (not shown) may be provided in the drive line between the counter shaft 14 and the differential 17, or between the differential 17 and either or both of the front wheels, in order that drive to the front wheels can be selectively coupled and decoupled.

Figure 4:
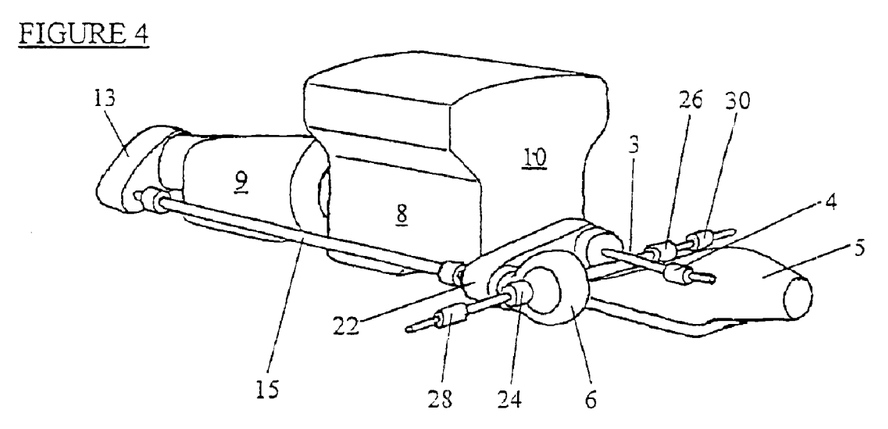
FIG. 4 is a perspective view of a second embodiment of a power train in accordance with the invention, in which a power take off is connected to a first drive shaft driving a rear differential of the vehicle.
Figure 5:
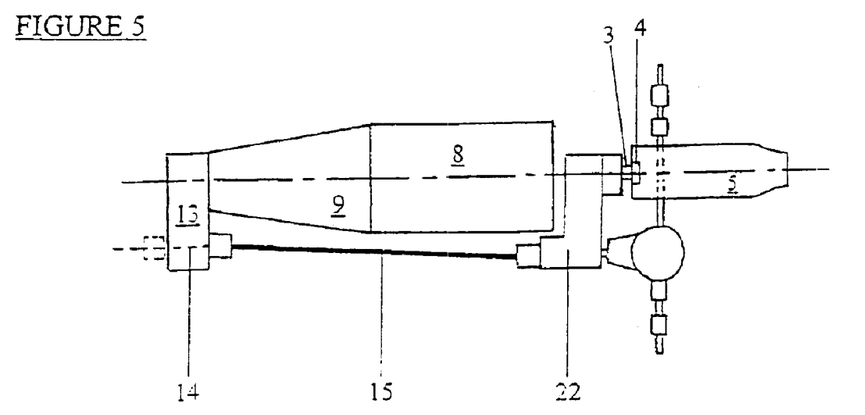
FIG. 5 is a plan view of the power train of FIG. 4.

A second embodiment of the invention will now be described with reference to FIGS. 4 and 5. An engine 8, transmission 9 and transfer drive 13 are arranged in the same manner as in the first embodiment described above, with a first drive shaft 15 driving a rear differential 6 from the transfer drive 13.

However, in this embodiment, the power take off is provided by a further transfer drive 22, which transfers drive from the first drive shaft 15 to the second drive shaft 3 for driving a water jet 5. A decoupler 4 selectively couples and decouples the drive from the second drive shaft 3 to the water jet 5. The further transfer drive 22 transfers drive from the propeller shaft by means of a belt or chain, although it would be possible to transfer the drive using gears.

One or more decouplers 24, 26 are provided in the drive line from the differential 6 to the rear wheels to allow selective decoupling of drive to the road wheels while the vehicle is in marine mode. In a particularly preferred embodiment, the decouplers 24, 26 are provided inboard of CV joints 28 and 30 also provided in the drive line. Where space in the vehicle is at a premium, the decouplers 24, 26 could be of the type, discussed above, which incorporate a synchromesh mechanism and which are combined with a CV joint. In such an arrangement, the separate CV joints 28, 30 will not be required. As an alternative to providing decouplers in the drive line between the differential 6 and the rear wheels, one or more decouplers may be incorporated into or ahead of differential 6 or into the transfer drive 22.

Where a four wheel drive capability is required then this can be provided in the same manner as has been described above in relation to the first embodiment.

Figure 6:
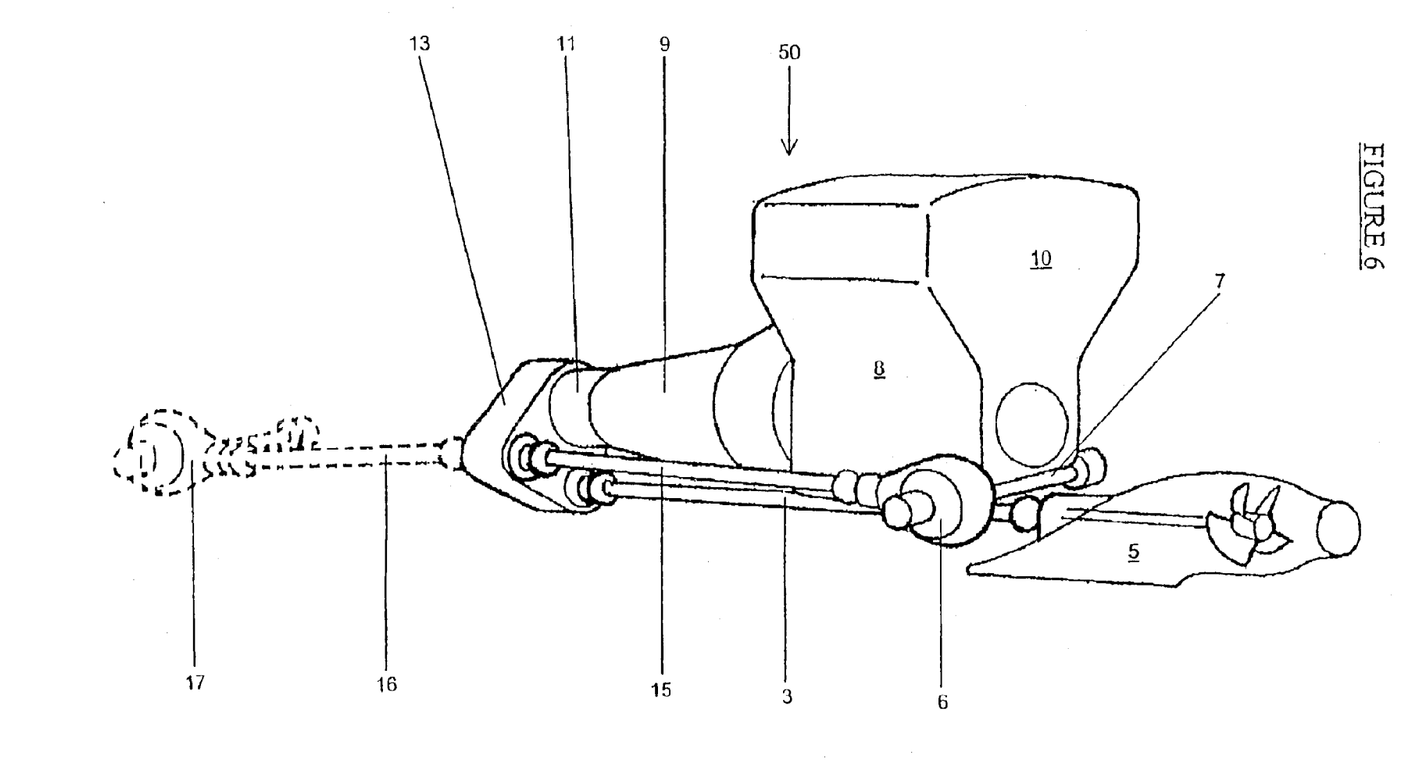
FIG. 6 is a perspective view of a third embodiment of a power train for an amphibious vehicle in accordance with the invention.
Figure 7:
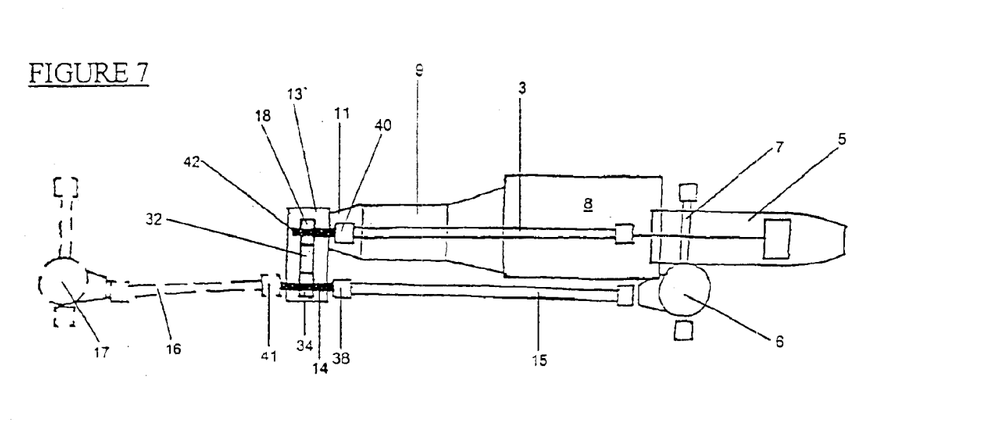
FIG. 7 is a plan view of the power train of FIG. 6.
Figure 8:
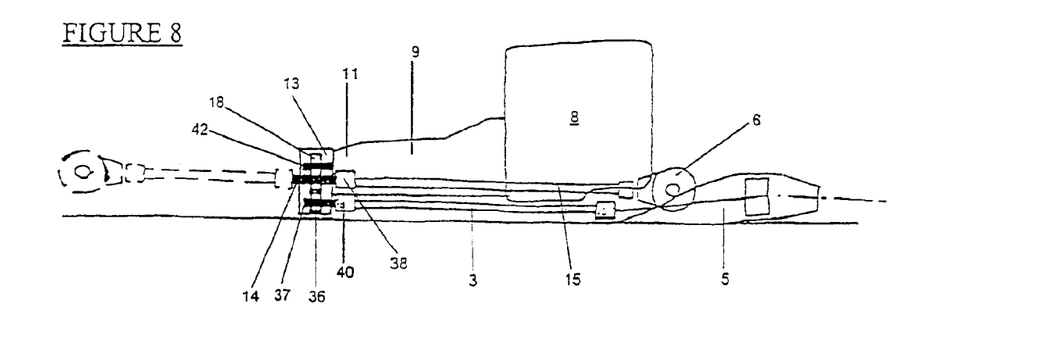
FIG. 8 is a side view, partially in section, of the power train of FIG. 6.

A third embodiment of the invention will now be described with reference to FIGS. 6 to 8. The power train 50 comprises an engine 8 and transmission 9 arranged in-line with the longitudinal axis of the vehicle. The engine is mounted toward the rear of vehicle with the output end 11 of the transmission 9 facing the front of the vehicle. A transfer drive 13 is fitted to the output end 11 of the transmission 9 and comprises a driving sprocket 18 which is drivingly coupled with an output shaft 42 of the transmission 9. The driving sprocket 18 is connected in driving engagement by means of a drive belt 32 with a first driven sprocket 34, which is mounted to a first counter shaft 14, and a second driven sprocket 36 mounted to a second counter shaft 37.

The first counter shaft 14 is connected via a decoupler 38 to a first drive shaft 15 which drives a rear differential 6. The rear differential 6 with a relay shaft 7 is located at the rear of the engine 8 for driving the rear wheels (not shown) of the vehicle.

The second counter shaft 37 is connected via a decoupler 40 to a second drive shaft 3. The second drive shaft 3 runs beneath the engine 8 to the rear thereof, for connection to a marine propulsion unit 5, for example a water jet.

As with the previous embodiments, a four wheel drive capability can be provided by connecting the first counter shaft 14 to a third drive shaft 16 for driving the front wheels via a front differential 17. As shown, the first counter shaft is connected to the third drive shaft 16 by a decoupler 41, so that drive to the front wheels can be selectively coupled and decoupled.

Figure 9:
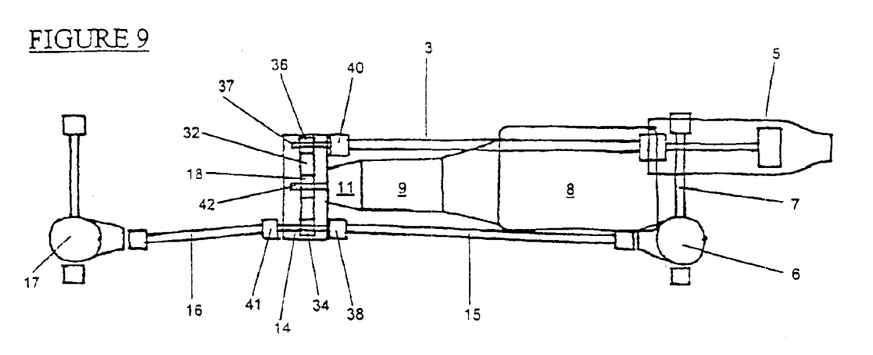
FIG. 9 is a plan view of a fourth embodiment of a power train for an amphibious vehicle in accordance with the invention.
Figure 10:
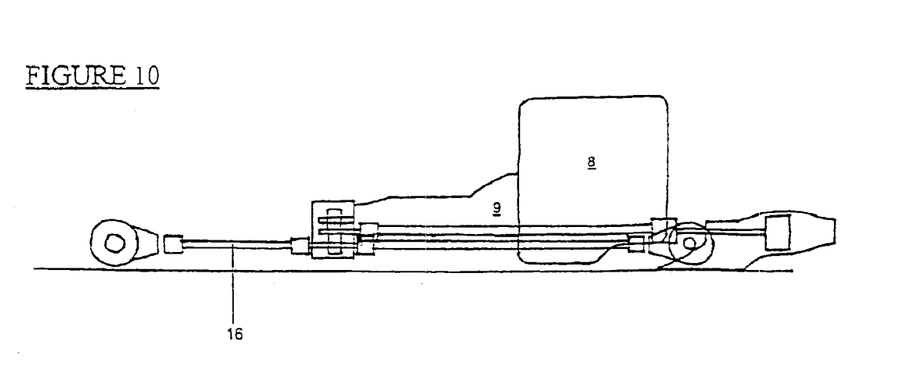
FIG. 10 is a side view, partially in section, of the power train of FIG. 9.

A fourth embodiment of the invention is shown in FIGS. 9 and 10. The fourth embodiment is substantially identical to the third embodiment except that the second drive shaft 3, which drives the marine propulsion unit 5, is arranged to run along one side of the engine 8 rather than below the engine. In the embodiment shown, the second drive shaft 3 runs along the opposite side of the engine from the first drive shaft 15, alongside the lower part of the cylinder block, below the cylinder bank. This arrangement enables the engine to be positioned lower in the vehicle, resulting in a lower centre of gravity which improves the handling characteristics of the vehicle in water and on land.

In a power train in accordance with the invention where the first drive shaft 15 is driven from the transmission through a transfer box, the axis of the first drive shaft is offset relative to the longitudinal axis of the engine 8 and transmission 9. Consequently, it is possible to position the engine and transmission just in front of the rear wheels and run the drive shaft 15 along one side of the engine to drive the rear differential 6 and the rear wheels. This arrangement overcomes many of the problems associated with the known amphibious vehicle power train layouts in which an in-line engine and transmission are located behind the rear wheels. With the engine located just in front of the rear wheels, the weight of the engine and transmission help to counter balance lift of the front of vehicle during acceleration. Furthermore, the centre of gravity of the vehicle is moved forward toward the centre of the vehicle, when compared with the prior art arrangements, which improves road holding and manoeuvrability of the vehicle on land. However, the engine and transmission are still located generally towards the rear of the vehicle which provides a more favourable weight distribution for travel of the vehicle on water.

In alternative embodiments (not shown), the engine 8 could be mounted so that only a part of the engine is located forward of the rear wheels. This may be advantageous in providing more room for passengers but without positioning the engine behind the rear axle as in the known arrangements. However, it is advantageous if the whole engine is located between the front and rear wheels because then the engine can be mounted lower in the vehicle. This lowers the centre of gravity of the vehicle which improves vehicle handling as described above.

Whereas the invention has been described in relation to what are presently considered to be the most practical and preferred embodiments, it is to be understood that the invention is not limited to the disclosed arrangements but rather is intended to cover various modifications and equivalent constructions included within the spirit and scope of the invention. For example, it is not essential that drive between the power take off and the marine propulsion unit be connected via a decoupler. Furthermore, the first drive shaft 15 could be arranged to extend beneath the engine 8 rather than along one side.

What is claimed is:

1. A power train for an amphibious vehicle comprising:

an in-line engine and speed change transmission assembly adapted such that the engine can be positioned towards the rear of the vehicle with the transmission output facing the front of the vehicle;

and a power take off means adapted to drive a marine propulsion unit located behind the engine;

wherein:

a transfer drive is provided in-line with the transmission, the transfer drive being adapted to drive a first drive shaft which extends rearwardly along one side of, or beneath the engine and which is adapted to drive a rear differential for driving the rear wheels of the vehicle, and the arrangement being such that the engine can be positioned at least partially forward of the rear wheels, and wherein the drive for the marine propulsion unit is provided through the transfer drive.

2. A power train as claimed in claim 1, adapted such that the engine can be positioned between the rear wheels and the front wheels of the vehicle.

3. A power train as claimed in claim 1, wherein the power take off is provided by the transfer drive which is adapted to drive the marine propulsion unit by means of a second drive shaft which runs substantially parallel to and below the engine.

4. A power train as claimed in claim 1, wherein the power take off is provided by the transfer drive which is adapted to drive the marine propulsion unit by means of a second drive shaft which runs substantially parallel to and along one side of the engine.

5. A power train as claimed in claim 4, wherein the first drive shaft runs along an opposite side of the engine to the second drive shaft.

6. A power train as claimed in claim 1, wherein the power take off comprises a further transfer drive which is fitted to, and driven by, the first drive shaft.

7. A power train as claimed in claim 1 wherein the marine propulsion unit is a water jet, or a marine screw propeller.

8. A power train as claimed in claim 1, wherein a decoupler is provided in the drive line from the power take off to the to the marine propulsion unit, to enable drive to the marine propulsion unit to be selectively coupled and decoupled.

9. A power train as claimed in claim 1 wherein the first drive shaft is adapted to drive the rear wheels of the vehicle via a rear differential.

10. A power train as claimed in claim 9, wherein the transfer drive also drives a third drive shaft which is adapted to drive the front wheels of the vehicle through a front differential.

11. A power train as claimed in claim 1, wherein a decoupler is provided in the drive line between the transmission and at least one of the driven wheels, such that drive to the at least one driven wheel can be selectively coupled or decoupled.

12. A power train as claimed in claim 11, wherein the at least one decoupler is arranged for coupling drive to a wheel drive shaft, the decoupler incorporating a synchromesh mechanism and being combined with a constant velocity joint.

13. An amphibious vehicle, characterised in that the vehicle comprises a power train as claimed in claim 1.

14. A power train for an amphibious vehicle comprising:

an in-line engine and speed change transmission assembly adapted such that the engine can be positioned towards the rear of the vehicle with the transmission output facing the front of the vehicle;

and a power take off means adapted to drive a marine propulsion unit located behind the engine;

wherein:

a transfer drive is provided in-line with the transmission, and the transfer drive is adapted to drive a first drive shaft which extends rearwardly along one side of, or beneath the engine and which is adapted to drive a rear differential for driving the rear wheels of the vehicle, the drive for the marine propulsion unit is provided through the transfer drive, and the power take off comprises a further transfer drive which is fitted to, and driven by, the first drive shaft, the arrangement being such that the engine can be positioned at least partially forward of the rear wheels.

* * * * *